(12) United States Patent
Kim

(10) Patent No.: US 8,766,547 B2
(45) Date of Patent: Jul. 1, 2014

(54) LIGHTING DEVICE AND METHOD OF CONTROLLING LIGHT EMITTED THEREBY

(75) Inventor: Namjin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 163 days.

(21) Appl. No.: 13/421,071

(22) Filed: Mar. 15, 2012

(65) Prior Publication Data

US 2013/0049600 A1 Feb. 28, 2013

(30) Foreign Application Priority Data

Aug. 25, 2011 (KR) .......................... 10-2011-0084895

(51) Int. Cl.
G09G 3/32 (2006.01)

(52) U.S. Cl.
USPC ........ 315/192; 315/185 R; 315/122; 345/102; 345/82

(58) Field of Classification Search
USPC ............. 315/192, 185 R, 186, 291, 294, 122, 315/123; 345/102, 82
See application file for complete search history.

(56) References Cited

U.S. PATENT DOCUMENTS

| | | | | |
|---|---|---|---|---|
| 7,932,681 B2 * | 4/2011 | Konno et al. | ................. | 315/291 |
| 8,035,307 B2 * | 10/2011 | Chew | ........................ | 315/200 R |
| 8,035,313 B2 * | 10/2011 | Wendt et al. | .................... | 315/291 |
| 8,358,081 B2 * | 1/2013 | Panagotacos et al. | ........ | 315/224 |
| 8,373,363 B2 * | 2/2013 | Grajcar | .......................... | 315/307 |
| 8,384,305 B2 * | 2/2013 | Liao et al. | ...................... | 315/294 |
| 8,384,307 B2 * | 2/2013 | Grajcar | .......................... | 315/307 |
| 2012/0262075 A1 * | 10/2012 | Lynch et al. | ................... | 315/192 |
| 2013/0207559 A1 * | 8/2013 | Ferrier | ........................... | 315/192 |

FOREIGN PATENT DOCUMENTS

| | | |
|---|---|---|
| KR | 10-2009-0048100 A | 5/2009 |
| KR | 10-2009-0065848 A | 6/2009 |
| KR | 10-2010-0132840 A | 12/2010 |
| KR | 10-2011-0072692 A | 6/2011 |

OTHER PUBLICATIONS

Korean Notice of Allowance dated Aug. 19, 2013 issued in Application No. 10-2011-0084895 (with English translation).

* cited by examiner

*Primary Examiner* — Vibol Tan
(74) *Attorney, Agent, or Firm* — Ked & Associates, LLP

(57) ABSTRACT

A lighting device and a method of controlling a light emitted thereby are disclosed. A lighting device including light emitting units configured of a plurality of light emitting diodes connected with each other in series according to the present invention may include a rectifier unit configured to rectify an alternation current voltage to supply the rectified voltage to each of the light emitting units, a control unit configured to control on and off of each light emitting unit according to the input voltage and light emitting units configured to be on and off based on the control of the control unit, wherein a first light emitting unit and a second light emitting unit are connected with each other in series, and the first light emitting unit and a third light emitting unit are connected with each other in parallel.

34 Claims, 14 Drawing Sheets

LIGHTING DEVICE AND METHOD OF CONTROLLING LIGHT EMITTED THEREBY

CROSS-REFERENCE TO RELATED APPLICATION

This application claims priority under 35 U.S.C. §119 from Korean Application No. 10-2011-0084895 filed on Aug. 25, 2011, the subject matter of which is incorporated herein by reference.

BACKGROUND

1. Field

Embodiments may relate to a lighting device, more particularly, to a lighting device including light emitting units configured of a plurality of light emitting diodes connected in series and a method of controlling a light emitted from the lighting device not to have an increasing light velocity abnormally or a reversed light velocity, during a dimming process.

2. Background

In the lighting industry, studies and researches have been still under development on a lighting source, a light emission type and a driving method of a lighting apparatus.

A conventional lighting system generally uses a lighting source such as an incandescent lamp, an electric discharge lamp and a fluorescent lamp for a household, landscape and industrial usage. Here, a resistive lighting source including the incandescent lamp has a low efficiency and a heat generation problem. The electric discharge lamp has problems of a high price and a high voltage. The fluorescent lamp has an environmental disadvantage of mercury usage.

To overcome disadvantages of those lighting sources, there have been increasing interests in a light emitting diode (LED) having advantages of light-emitting efficiency, color variety and design autonomy. There have been increasing studies and researches on a lighting system including the LED as lighting source. The LED is a semiconductor element which emits a light when a voltage is applied thereto forwardly. The LED has a long usage life, low power consumption, with electrical, optical and physical properties which are proper to mass production and the LED has been rapidly replacing the incandescent lamps and fluorescent lamps.

In the meanwhile, lighting apparatuses such as a large amount of light emitting diodes or sensors are required in a building and a plant requires a large building such as. Also, a lighting system for managing and controlling such lighting apparatuses is required.

SUMMARY

Accordingly, the embodiments may be directed to a lighting device and a method of controlling a light emitted thereby. To solve the problems, an object of the embodiments may be to provide a lighting device a method of controlling a light emitted by a lighting device including a plurality of light emitting units configured of a plurality of light emitting diodes connected in series, not to increase a light velocity unnaturally during a dimming process or not to reverse the light velocity.

To achieve these objects and other advantages and in accordance with the purpose of the embodiments, as embodied and broadly described herein, a lighting device including light emitting units configured of a plurality of light emitting diodes connected with each other in series according to the present invention may include a rectifier unit configured to rectify an alternation current voltage to supply the rectified voltage to each of the light emitting units, a control unit configured to control on and off of each light emitting unit according to the input voltage and light emitting units configured to be on and off based on the control of the control unit, wherein a first light emitting unit and a second light emitting unit are connected with each other in series, and the first light emitting unit and a third light emitting unit are connected with each other in parallel.

And, a lighting device including light emitting units configured of a plurality of light emitting diodes connected with each other in series may include a rectifier unit configured to rectify an alternation current voltage to supply the rectified voltage to each of the light emitting units; a control unit configured to control a first light emitting unit to be switched on until a first level and a third light emitting unit to be switched on until a second level and a second light emitting unit to be switched on until a third level, to prevent light velocity change from reversed according to the input voltage by controlling on and off of each of the light emitting units; and a light emitting unit configured to be switched on and off based on the control of the control unit.

Also, a lighting device including light emitting units configured of a plurality of light emitting diodes connected in series may include a rectifier unit configured to rectify an alternation current voltage to supply the rectified voltage to each of the light emitting units; a control unit configured to control a first light emitting unit to be switched on only in a first period and a third light emitting unit to be switched on only in first second periods and a second light emitting unit to be switched on before the third light emitting unit is switched off in the second period, to prevent light velocity change from reversed according to the input voltage by controlling on and off of each of the light emitting units; and a light emitting unit configured to be switched on and off based on the control of the control unit.

In another aspect of the present invention, a method of controlling a light in a lighting device including light emitting units configured of a plurality of light emitting diodes connected in series may include (a) rectifying an alternation current voltage input thereto and supplying the rectified voltage to each of the light emitting units at a rectifier unit; and (b) controlling on and off of corresponding one out of the light emitting units according to the input rectified voltage, to control lights emitted from the light emitting units at a control unit, wherein a first light emitting unit is connected with a third light emitting unit in parallel and with a second light emitting unit in series, among the light emitting units.

And, a method of controlling a light in a lighting device including light emitting units configured of a plurality of light emitting diodes connected in series may include rectifying an alternation current voltage input thereto and supplying the rectified voltage to each of the light emitting units at a rectifier unit; and controlling corresponding one of the light emitting units to be on and off based on the input voltage by a preset level at a control unit, wherein a first light emitting unit is switched on until a first level, a third light emitting is switched on until a second level and a second light emitting unit is switched on until a third level, and wherein each light emitting unit is switched on and off for change in the light velocity not to be reversed based on the input voltage.

Also, a method of controlling a light in a lighting device including light emitting units configured of a plurality of light emitting diodes connected in series may include rectifying an alternation current voltage input thereto and supplying the rectified voltage to each of the light emitting units at a rectifier unit; and controlling corresponding one of the light emitting units based on the rectified voltage inputted thereto to be on and off by a preset period at a control unit, wherein the first light emitting unit is switched on only in a first period, a third light emitting unit is switched on only in first and second periods and a second light emitting unit is to be switched on from a second period, and wherein each of the light emitting units is switching on and off for the light velocity change not to be reversed based on the input voltage.

The present invention may have following advantages. First, reverse of a light velocity may be prevented which might be generated according to an input voltage. Because of that, a power factor, efficiency, dimming performance of the lighting device may be enhanced.

Second, the present invention may configurate and form a circuit may simply via an auxiliary cell. Because of that, the rising cost may be minimized.

It is to be understood that both the foregoing general description and the following detailed description of the embodiments or arrangements are exemplary and explanatory and are intended to provide further explanation of the embodiments as claimed.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
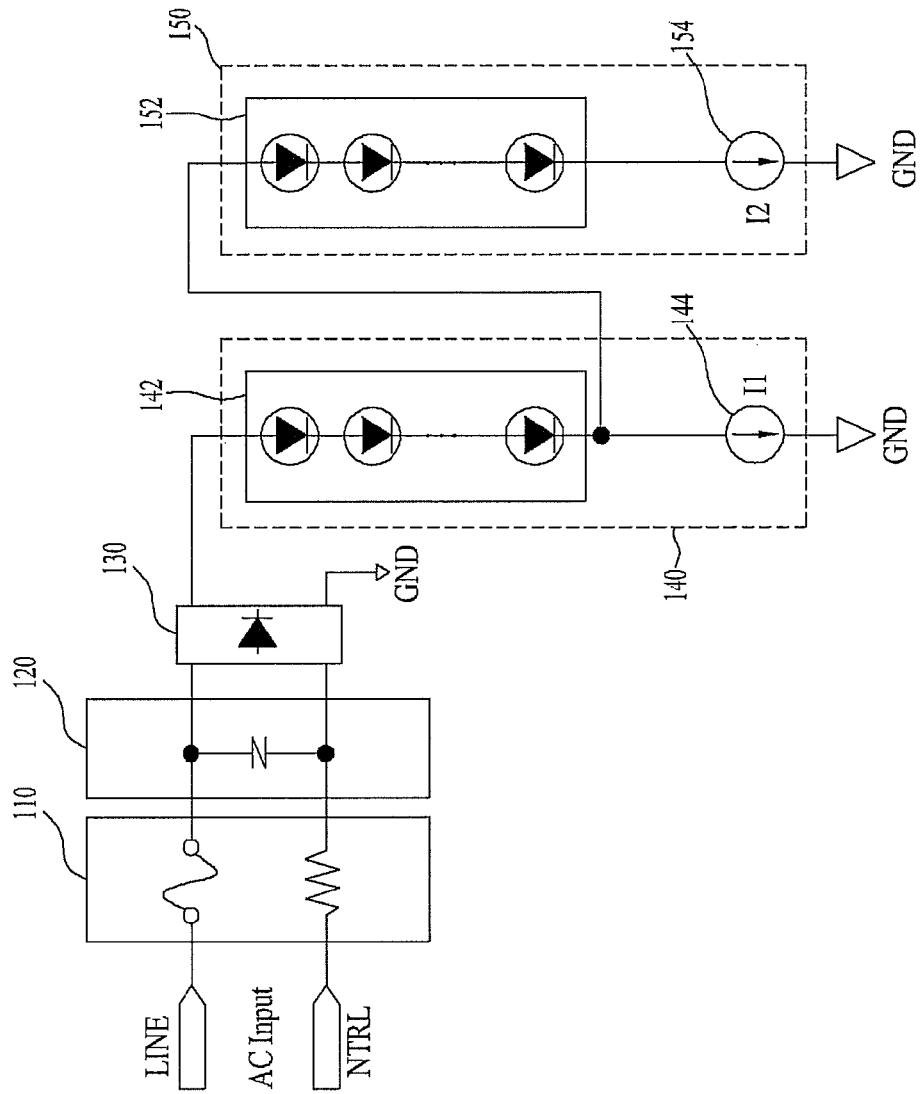
FIG. 1 is a block view illustrating a lighting device according to an embodiment.

As follows, a lighting apparatus according to an exemplary embodiment of the present invention and a method of emitting a light using the same will be described in reference to the accompanying drawings. Reference will now be made in detail to the specific embodiments of the present invention, examples of which are illustrated in the accompanying drawings.

Wherever possible, the same reference numbers will be used throughout the drawings to refer to the same or like parts and repeated description will be omitted. The size and appearance of each component shown in the drawings may be exaggerated or diminished for convenient explanation.

Terminology including ordinal numbers such as 'first' and 'second' may be used in describing a variety of components and the components are not limited by the terminological expressions and the terminological expressions are used only for distinguish one of the components from the others.

FIG. 1 is a block view illustrating a lighting device according to an embodiment.

As shown in FIG. 1, the lighting device may include a rectifier unit and light emitting units 140 and 150.

The rectifier unit may rectify an alternation current voltage inputted thereto and it may supply the rectified voltage to the light emitting units 140 and 150. The rectifier unit may include a protection circuit 110 and a serge protection circuit 130.

FIG. 1 illustrates two light emitting units 140 and 150 connected with the rectifier unit.

Here, each of the light emitting units may include a single light emitting group and a current source.

Alternatively, each of the light emitting group may include a plurality of light emitting diodes connected in series. In other words, the first light emitting group 142 may be connected with the second light emitting group 152 in series.

As follows will be described in detail an overall operation of the lighting device shown in FIG. 1, especially, on/off of the light emitting diodes provided in each of the light emitting groups 142 and 152 based on the input voltage rectified in the rectifier unit.

Figure 2:
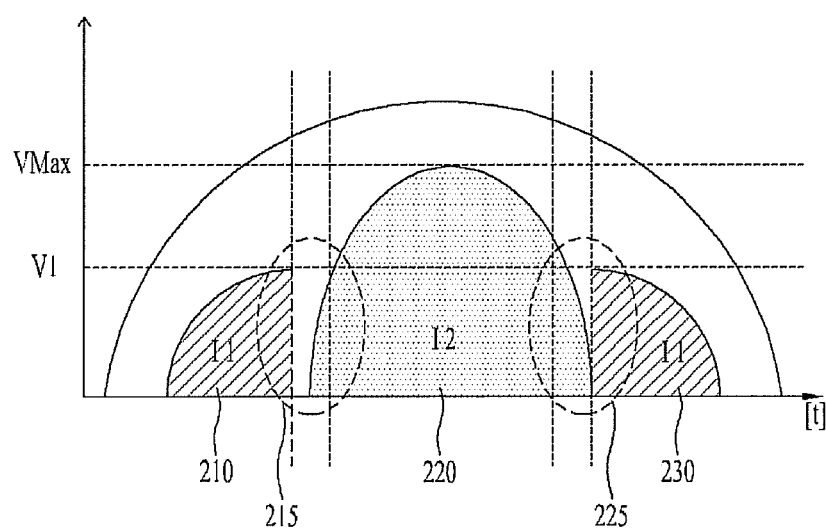
FIG. 2 is a diagram illustrating a light emitting method of the lighting device shown in FIG. 1.
Figure 3:
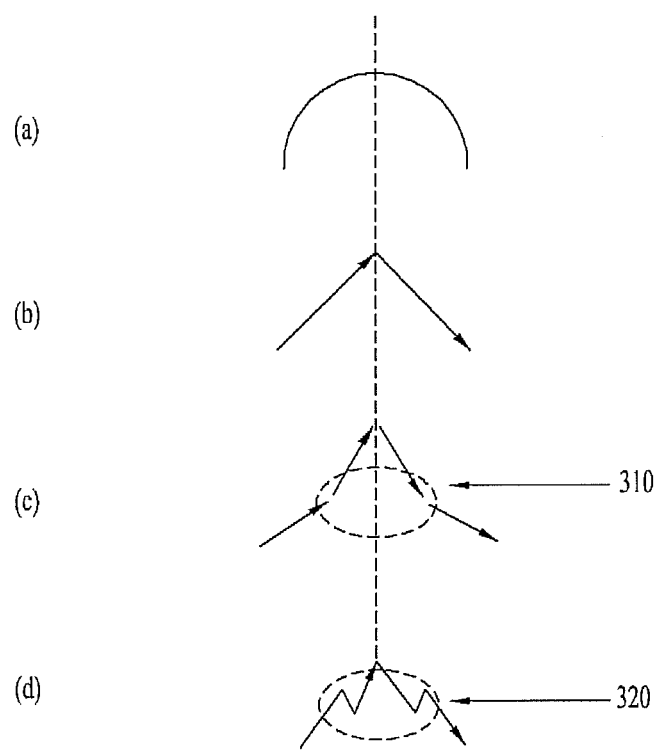
FIG. 3 is a diagram illustrating an example of change in a light velocity according to FIG. 2 and Table 1.

FIG. 2 is a diagram illustrating a light emitting method of the lighting device shown in FIG. 1. FIG. 3 is a diagram illustrating an example of light velocity change according to FIG. 2 and Table 1.

In reference to FIG. 2, a horizontal axis may refer to a time axis ([t]) and a vertical axis may refer to a voltage level or quantity ([v]).

Here, a semicircle-shaped curve with respect to the time axis represents change of the voltage input after rectified in the rectifier unit mentioned above as shown in FIG. 3(a).

FIG. 2 shows largely three periods with respect to the horizontal axis, that is, the time axis based on the input voltage and largely two periods with respect to the vertical axis.

For example, in case of the former, that is, in case of with respect to the horizontal axis, there may be three periods including periods 210 and 230 in which only the first light emitting group 142 is switched on and a period in which only the second light emitting group 152 is switched on, based on the input voltage. At this time, gaps 215 and 225 may be located between each of the periods having only the first light emitting group 142 being on and the period having only the second light emitting group 152 being on. In other words, at a moment when the first light emitting group 142 is off after on in the period 210 where only the first light emitting group 142 is on, the second light emitting group 152 is on in a preset time period after the first light emitting unit is off, not when immediately the period in which only the second light emitting unit is on starts. In contrast, the first light emitting group 152 may not be on immediately when the second light emitting group 152 is off after on in the period 220, in which only the second light emitting group 152 is on, but it may be on in a time period after when the period 230 in which only the first light emitting group 142 is one starts.

However, in case of the latter, that is, with respect to the vertical axis, there may be two periods including periods 210 and 230 to V1 level and a period 220 to V2 level, based on the input voltage. Here, when reaching V1 level, the first light group 142 may be on and off, regardless of on and off of the second light emitting group 152. Because of that, the second light emitting group 152 may not be on yet, even when the first light emitting group 142 is off after reaching V1 level as shown in the drawings.

Table 1 illustrates the latter method mentioned above, for example, the method shown in FIG. 2.

TABLE 1

| | Level | |
| --- | --- | --- |
| | 0~V1 | V1~Vmax |
| CS1 | I1_Level1 | OFF |
| CS2 | OFF | I2_level1 |

As shown in Table 1, until V1 level (0~V1), a current source (CS1) 144 connected with the first light emitting group 142 may be switched on and a current source (CS2) 154 connected with the second light emitting group 152 may be switched off.

In contrast, until V2 level (V~Vmax), only the current source (SC2) 154 connected with the second light emitting group 152 may be switched on and the current source (CS1) 144 connected with the first light emitting group 142 may be switched off.

V1 and Vmax may be a reference value randomly determined with respect to a value of the voltage input after rectified in the rectifier unit provided in the lighting device. Vmax may be not a maximum value of the input voltage. Also, a range of voltage levels covered by V1 level may be in symmetry with a rage of voltage levels covered by V2 level or not.

In reference to FIG. 3, change in the input voltages, the number of the switched-on light emitting diodes and the light velocity may be compared in FIG. 2 and Table 1.

First of all, FIG. 3(a) illustrates change in the input voltages. Considering flow of the time from left to right, the input voltage is increased gradually and decreased, passing its zenith as shown in FIG. 2.

FIG. 3(b) illustrates change in the number of the light emitting diodes switched-on according to the change of the input voltage. In reference to FIG. 3(b), the number of the light emitting diodes switched on according to the input voltage is constantly increased and gradually decreased when the input voltage is decreased. For example, the number of the light emitting diodes may be in proportion to the input voltage of FIG. 3(a).

FIG. 3(c) illustrates an example of change in the light velocity in the lighting device according to the change of the input voltage shown in FIG. 3(a). Here, in reference to FIG. 3(c), the change of the light velocity may not necessarily be in proportion to the change in the input voltage shown in FIG. 3(a) or the change in the number of the switched-on light emitting diodes shown in FIG. 3(b). In other words, even when the input voltages and the number of the switched-on light emitting diodes are increased continuously, a non-linear area 310, that is, a discontinuity-point may be generated in the change in the velocity of light. Here, that non-linear point 310 may mean that the lighting device is drastically brighter or darker at a specific point, not that the lighting device is gradually brighter or darker. This phenomenon might create the user's anxiety that the lighting device is abnormal.

FIG. 3(d) illustrates another example of change in the velocity of the light in the lighting device according to the change in the input voltage. Here, in reference to FIG. 3(c), the change in the velocity of light may not be in proportion to the input voltage shown in FIG. 3(a) or the change in the number of the switched-on light emitting diodes necessarily. In other words, even when the input voltages and the number of the switched-on light emitting diodes are increased continuously, the discontinuity-point 320 may be generated in the change of the light velocity. Here, the discontinuity light velocity change point 320 may be generated in the light velocity change. Here, the discontinuity light velocity change point 320 may refer to the point at which the light velocity change is increased unnaturally or the light velocity change is reversed during the dimming process of the lighting device, for example. In reference to FIG. 2 and Table 1, this is because the light velocity fails to be compensated by the off of the first light emitting group 142 which happens before the light velocity is changed linearly by the switched-on second light emitting group 152, for example. A first point 215 and a second point 225 shown in FIG. 2 show the reason.

The light velocity change may create the user's anxiety that the lighting apparatus is temporarily darker after flickering or bright or temporarily brighter after darker.

Figure 4:
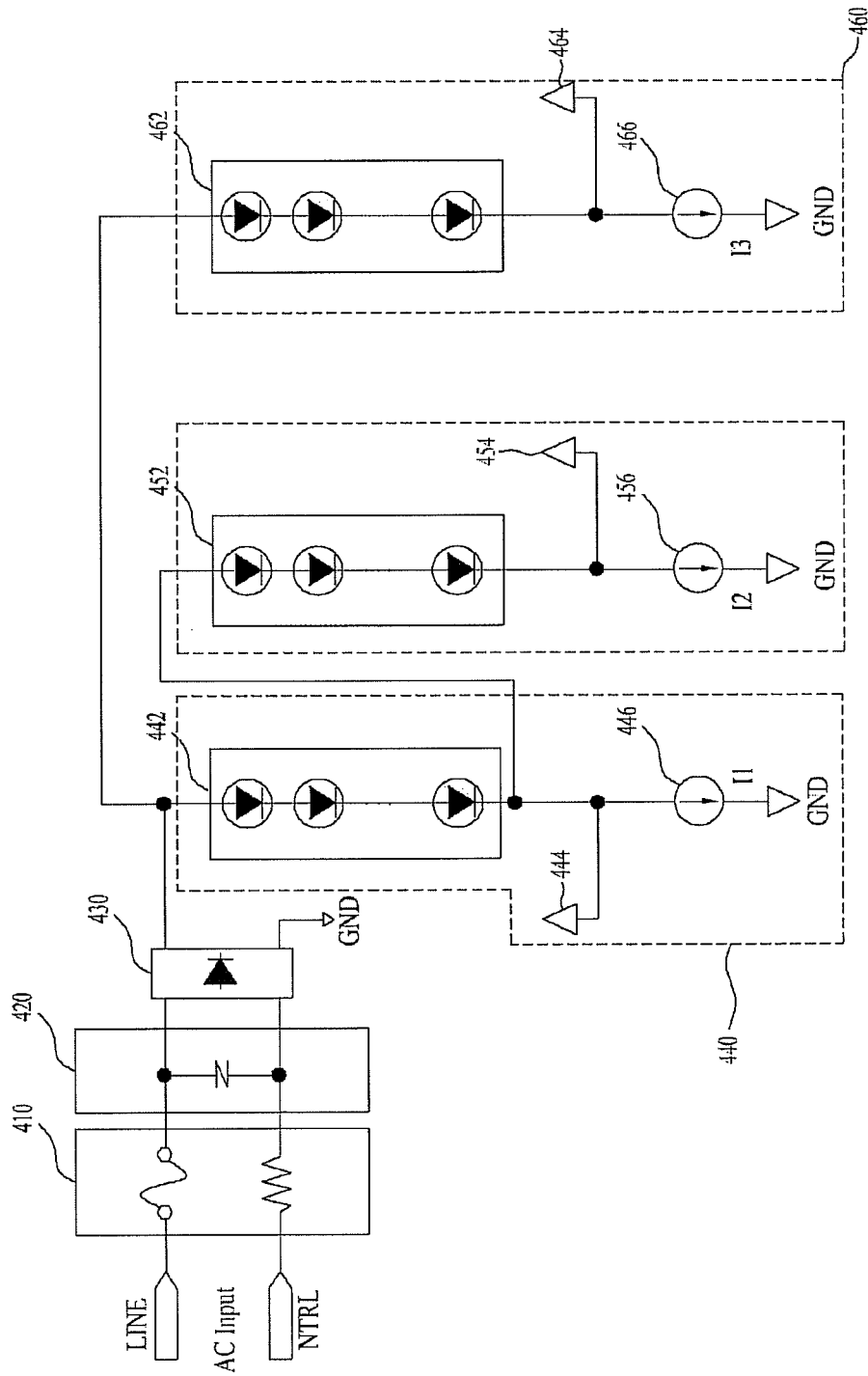
FIG. 4 is a block view illustrating a lighting device according to another embodiment.

FIG. 4 is a block view illustrating a lighting device according to another embodiment.

In reference to FIG. 4, a lighting device including light emitting units configured of a plurality of light emitting diodes connected with each other in series according to an aspect of the present invention may include a rectifier unit configured to rectify an alternation current voltage to supply the rectified voltage to each of the light emitting units, a control unit (not shown) configured to control on and off of each light emitting unit according to the input voltage, and light emitting units 440, 450 and 460 configured to be on and off based on the control of the control unit. At this time, the lighting device according to the embodiment may have a first light emitting unit 440 and a second light emitting unit 450 connected with each other in series and it may have the first light emitting unit 440 and a third light emitting unit 460 connected with each other in parallel.

According to another aspect of the present invention, a lighting device including light emitting units configured of a plurality of light emitting diodes connected with each other in series may include a rectifier unit configured to rectify an alternation current voltage to supply the rectified voltage to each of the light emitting units, a control unit configured to control a first light emitting unit 440 to be switched on until a first level and a third light emitting unit 460 to be switched on until a second level and a second light emitting unit 450 to be switched on until a third level, to prevent light velocity change from reversed according to the input voltage by controlling on and off of each of the light emitting units, and a light emitting unit configured to be switched on and off based on the control of the control unit. Especially, this embodiment is described in an aspect of a vertical axis shown in FIG. 5, in other words, considering a voltage level.

In a further aspect of the present invention, a lighting device including light emitting units configured of a plurality of light emitting diodes connected in series may include a rectifier unit configured to rectify an alternation current voltage to supply the rectified voltage to each of the light emitting units, a control unit configured to control a first light emitting unit 440 to be switched on only in a first period and a third light emitting unit 460 to be switched on only in first second periods and a second light emitting unit 450 to be switched on before the third light emitting unit 460 is switched off in the second period, to prevent light velocity change from reversed according to the input voltage by controlling on and off of each of the light emitting units, and a light emitting unit configured to be switched on and off based on the control of the control unit. Especially, this embodiment may be described by periods divided with respect to a horizontal axis shown in FIG. 5, that is, a time axis.

In reference to FIG. 4, each of the components composing the lighting device will be described.

The rectifier unit may rectify an alternation current voltage inputted thereto and it may supply the rectified voltage to the plurality of the light emitting units. The rectifier unit may include a protection circuit 410 and a surge protection circuit 420 and a rectifier circuit 430.

In FIG. 4 different from FIG. 1, three light emitting units 440, 450 and 460 may be connected with the rectifier unit. At hits time, the first light emitting unit 440 and the second light emitting unit 450 connected with the rectifier unit may be connected in series. Also, the first light emitting unit 440 and the third light emitting unit 460 connected with the rectifier unit may be connected in parallel.

For example, each of the light emitting units may include light emitting groups 442, 452 and 462 having a plurality of light emitting diodes connected in series, connection control means 444, 454 and 464 and current sources 446, 456 and 466. For example, the first light emitting unit 440 may be configured of a first light emitting group 442, first connection control means 444 and a first current source (CS1) 446. The second light emitting unit 450 connected with the first light emitting unit 440 in series may be configured of a second light emitting group 452, second connection means 454 and a second current source (CS2) 456. Lastly, the first emitting unit 460 may be configured of a third light emitting unit 462, third connection control means 464 and a third current source (CS3) 466.

The control unit may basically perform a function of controlling on and off of each light emitting unit via the connection control means. Here, an algorithm and method of the control unit controlling the on and off of each light emitting unit according to the present invention will be described in detail in reference to FIG. 5 and Table 2, omitted herein.

The connection control means 444, 454 and 464 may be located between the light emitting group 442, 452 and 462 and the current source 446, 456 and 466, as a middle tap and a switch, to connect or disconnect the both of the light emitting group and the current source based on the control of the control unit.

As follows will be described in detail in reference to FIG. 5 and Table 2 an overall operation of the lighting device including on and off of the light emitting diodes provided in the lighting device of FIG. 4, especially, in the light emitting groups 442, 452 and 462 according to the voltage input after rectified in the rectifier unit.

Figure 5:
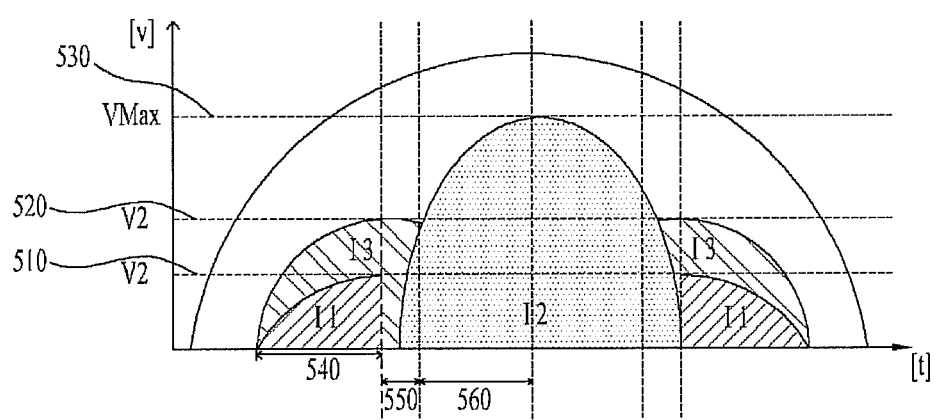
FIG. 5 is a diagram illustrating a light emitting method of the lighting device shown in FIG. 4.
Figure 6:
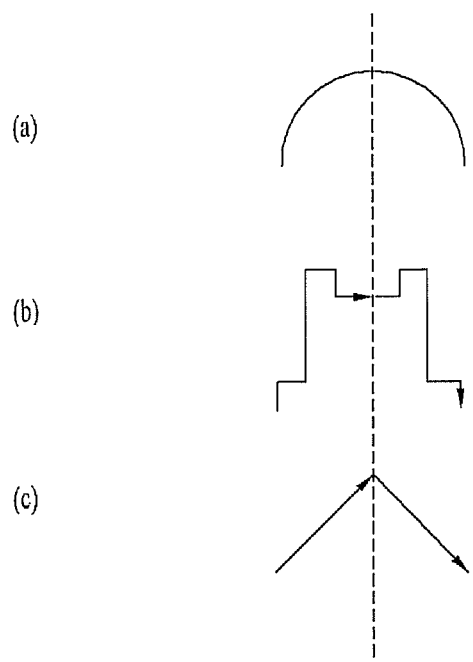
FIG. 6 is a diagram illustrating relation between the change in the light velocity and the number of switched-on light emitting diodes in the lighting device shown in FIG. 5.

FIG. 5 is a diagram illustrating a light emitting method of the lighting device shown in FIG. 4. FIG. 6 is a diagram illustrating relation between the change in the light velocity and the number of the lighting diodes that are switched on.

Similar description of FIGS. 5 and 6 and Table 2 will be quoted from the description of FIG. 2 and Table 1 and it will be omitted accordingly. Herein after, a different configuration will be described.

The control unit configured to control the on and off of the light emitting unit may basically control the on and off of each light emitting group 442, 452 and 462 to control light velocity change of the lighting device not to be reversed based on the input voltage input via the rectifier unit.

Here, the control unit may control the on and off of a corresponding light emitting unit via the connection control means 444, 454 and 464 provided in the light emitting groups 442, 452 and 462, respectively.

Here, the third light emitting unit 460 may include a less number of light emitting diodes connected in series than the first light emitting unit 440.

According to the present invention, the light velocity change may be controlled not to be reversed and the number of the light emitting diodes switched on according to the input voltage may not be increased linearly because of that.

As follows, a control process for the on and off of the light emitting unit based on a voltage level in reference FIGS. 4 and 5 and Table 2 will be described.

Like the description of FIG. 2 mentioned above, a horizontal axis of FIG. 5 refers to a time axis and a vertical axis refers to a voltage level axis.

Here, in case of FIG. 5 different from FIG. 2, there are three voltage level references V1, V2 and Vmax in the vertical axis and three time periods in the horizontal axis, which is different from the meaning of FIG. 2.

For example, Table 1 illustrates each level and the on and off control of the light emitting unit with respect to the vertical axis of FIG. 5.

TABLE 2

|  | Level | | |
| --- | --- | --- | --- |
|  | 0~V1 | V1~V2 | V2~Vmax |
| CS1 | I1_Level1 | OFF | OFF |
| CS2 | I2_Level1 or OFF | I2_Level1 | I2_Level1 |
| CS3 | I3_Level1 | I3_Level2 | OFF |

For example, in reference to FIG. 5 and Table 2, the first light emitting unit 440 to the third light emitting unit 460 are switched on at V1 level (0~V1) according to the input voltage with respect to the vertical axis. At this time, the second light emitting unit 450 may be switched on if necessary, for example.

Next, the first light emitting unit 440 may be switched off and only the second and third light emitting units 450 and 460 may be switched on at V2 level (V1~V2).

Last, the second light emitting unit 450 may be switched on, and the first light emitting unit 440 and the third light emitting unit 460 may be switched off at Vmax level (V2~Vmax).

For that, the control unit may control the first light emitting unit 440 to be switched on and the third light emitting unit 460 to be switched on until a second level and the second light emitting unit 450 to be switched on until a third level, according to the input voltage.

At this time, the control unit may control the first and third light emitting unit 440 and 460 to be switched on simultaneously or them to be on until the first level together.

The control unit may control the first and second light emitting units 440 and 450 not to be on simultaneously.

Also, the control unit may control the second light emitting unit 450 to be on before the third light emitting unit 460 is off.

In contrast, a control process with respect to the time periods of the horizontal axis, not the voltage level references described above will be described as follows.

With respect to the horizontal axis, only the first light emitting unit 440 and the third light emitting unit 460 may be switched on (710 and 720) in a first period.

In a second period, the first light emitting unit 440 may be switched off and the third light emitting unit 460 may be still off. At this time, the second light emitting unit 450 may be switched on a predetermined time before the third light emitting unit 460 is switched off, for example.

In a third period, only the second light emitting unit 450 may be switched on and the first and third light emitting units 440 and 460 may be off.

Even when the input voltage is decreased after passing its zenith, the light emitting units may be operated in reverse.

The control unit controls the first light emitting unit 450 to be on until a first period and the third light emitting unit 460 to be on until a second period and the second light emitting unit 450 to be on before the third light emitting unit 460 is off in the second period.

At this time, the control unit may control the third light emitting unit 460 to be switched on from the first period.

The control unit may control the first and third light emitting units 440 and 460 to be switched on simultaneously or to be on until the first period together.

In reference to FIG. 6, change in the input voltages, the number of the switched-on light emitting diodes and the light velocity may be compared in FIGS. 4 and 5 and Table 2.

First of all, FIG. 6(*a*) illustrates change in the input voltages. Considering flow of the time from left to right, the input voltage is increased gradually and decreased, passing its zenith as shown in FIG. 5.

FIG. 6(*b*) illustrates change in the number of the light emitting diodes switched-on according to the change of the input voltage. In reference to FIG. 6(*b*), the number of the light emitting diodes switched on according to the input voltage is not increased linearly, different from FIG. 3. For example, in FIG. 6(*b*), the number of the switched-on light emitting diodes is small in a period having a low input voltage and it is drastically increased in a period having a preset level of the input voltage. After that, the number of the switched-on light emitting diodes is decreased near the zenith of the input voltage.

This may be understood easily in reference to FIG. 5 and Table 2. In other words, in case of the lower input voltage, the first and third light emitting units 460 may be partially switched on and when the input voltage is increased to reach a preset level, all of the three light emitting units may be switched on and this is the zenith of FIG. 6(*b*). After that, the first light emitting unit 440 may be switched off again and the third light emitting unit 460 may be switched off gradually after that. As a result, the curve shown in FIG. 6(*b*) is not linearly but a kind of stepped, different from FIG. 3.

FIG. 6(*c*) illustrates an example of change in the light velocity in the lighting device based on change of the input voltage. Here, in reference to FIG. 6(*c*), the change in the light velocity may not be in proportion to change in the number of switched-on light emitting diodes shown in FIG. 6(*b*) necessarily but it may be in proportion to the input voltage shown in FIG. 6(*a*). In other words, even when the number of the light emitting diodes switched on in the period having the increased input voltage is increased, the change in the light velocity may be increased without a reversed period. In contrast, when the number of the light emitting diodes switched on in the period having the decreased input voltage is increased, the change in the light velocity may be decreased without a reversed period.

As a result, according to the present invention, although the number of the switched-on light emitting diodes is non-linear, the change in the light velocity the user senses may be linear, not reversed, and it may not be increased unnaturally during the dimming. Because of that, the user may feel comfortable, different from FIGS. 1 to 3 mentioned above. In addition, the linearity of the change in the light velocity may prevent the lighting device from flickering or getting darker after bright and vice versa, different from FIGS. 1 to 3.

In reference to FIGS. 4 to 6, the reverse of the light velocity change may be prevented, compared with FIGS. 1 to 3. The third light emitting unit 460 may be connected with the first light emitting unit 440 in parallel. Because of that, the reverse of the light velocity change may be prevented by the second light emitting unit 450 that is still not switched on at the point when the first light emitting unit 440 is switched off. In other words, as shown in FIG. 5, the first light emitting unit 440 may be off at V1 level and the second light emitting unit 450 may not be switched on the point when the first light emitting unit 440 is switched off. However, the third light emitting unit 460 may be switched off after on until V2 level, that is, in a range where the overall light velocity change is not reversed, for example, at a light velocity enough to switch on the second light emitting unit 450. Because of that, the light velocity change of the second light emitting unit 450 having an enough increased voltage level already may not be reversed even after the third light emitting unit 460 is switched off.

As follows, each of the components shown in FIG. 4 will be described in detail.

Figure 7:
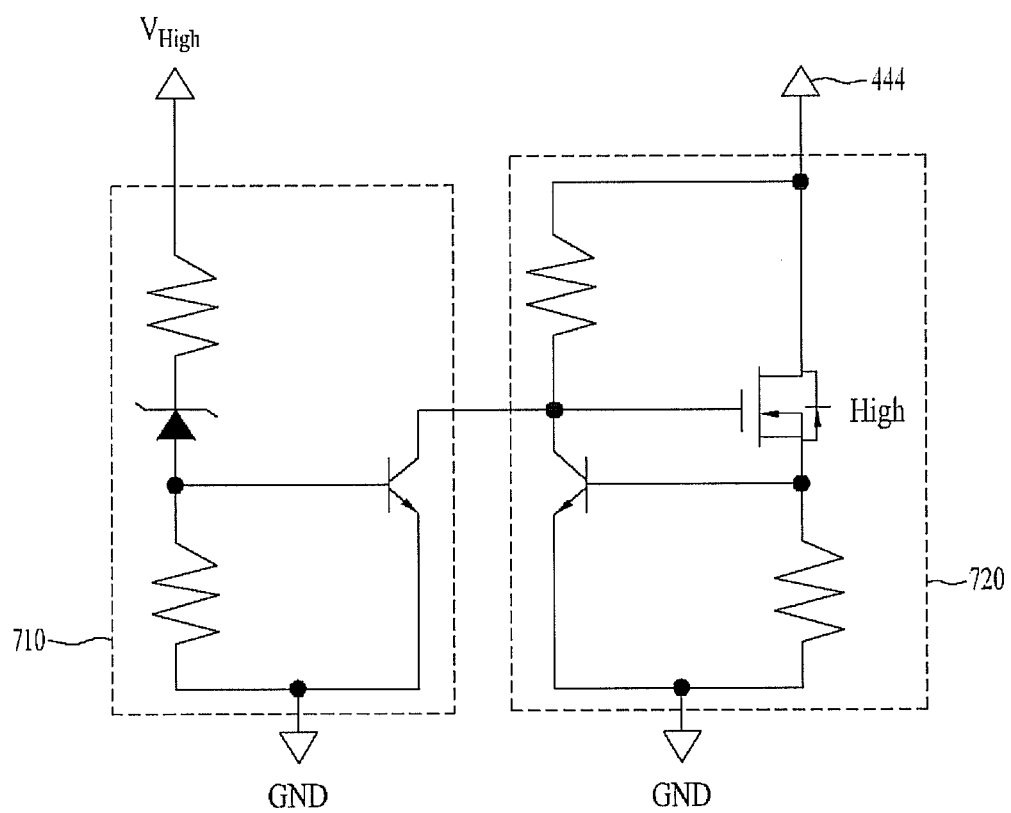
FIG. 7 is a block view illustrating an example of a detailed configuration of a first current source shown in FIG. 4.

FIG. 7 is a block view illustrating a detailed configuration of a first current source 462 shown in FIG. 4 according to an embodiment.

FIG. 7 illustrates a detailed circuit configuration of the first current source 446 provided in the first light emitting unit 440.

Such the first current source 446 may be a circuit configured to control a current input to the light emitting diode provided in the light emitting group, to control the light emitting diodes to be on and off. At this time, the current control circuit may include a feedback resistance to control the amount of currents input to amplifiers, for example. Also, the currents input to the current control circuit may be controlled by the connection control means 444 according to the present invention. A level of such the input current may be re-controlled by the feedback resistance.

In the meanwhile, FIG. 7 illustrates a right voltage level sensing circuit as well as a right current source, in other words, between the connection control means 444 and a ground (GND).

The voltage level sensing circuit may be located at a rear end of the rectifier circuit 430 provided in the rectifier unit shown in FIG. 4, that is, between terminals of VHIGH and the ground (GND).

Such the voltage level sensing circuit may sense a voltage level by controlling the resistance via a variable resistance, when the voltage rectified in the rectifier unit is input.

Figure 8:
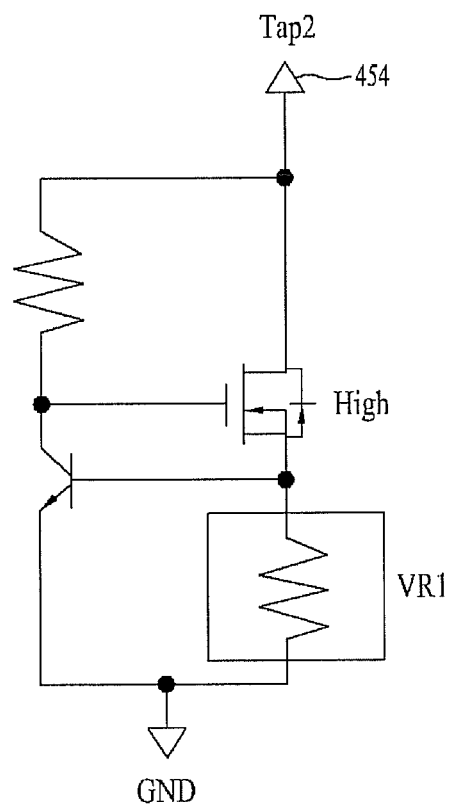
FIG. 8 is a block view illustrating an example of a detailed configuration of a second current source shown in FIG. 4 according to an embodiment.

FIG. 8 is a block view illustrating an example of the detailed configuration possessed by the second current source shown in FIG. 4.

FIG. 8 illustrates a circuit configuration of the second current source 456 possessed by the second light emitting unit 450 shown in FIG. 4.

For example, such the second current source 456 may have the same circuit configuration as the right current control circuit shown in FIG. 7 and it may be controlled by the second connection control means 454. The description of the right area shown in FIG. 7 is quoted and the same detailed description will be omitted.

Figure 9:
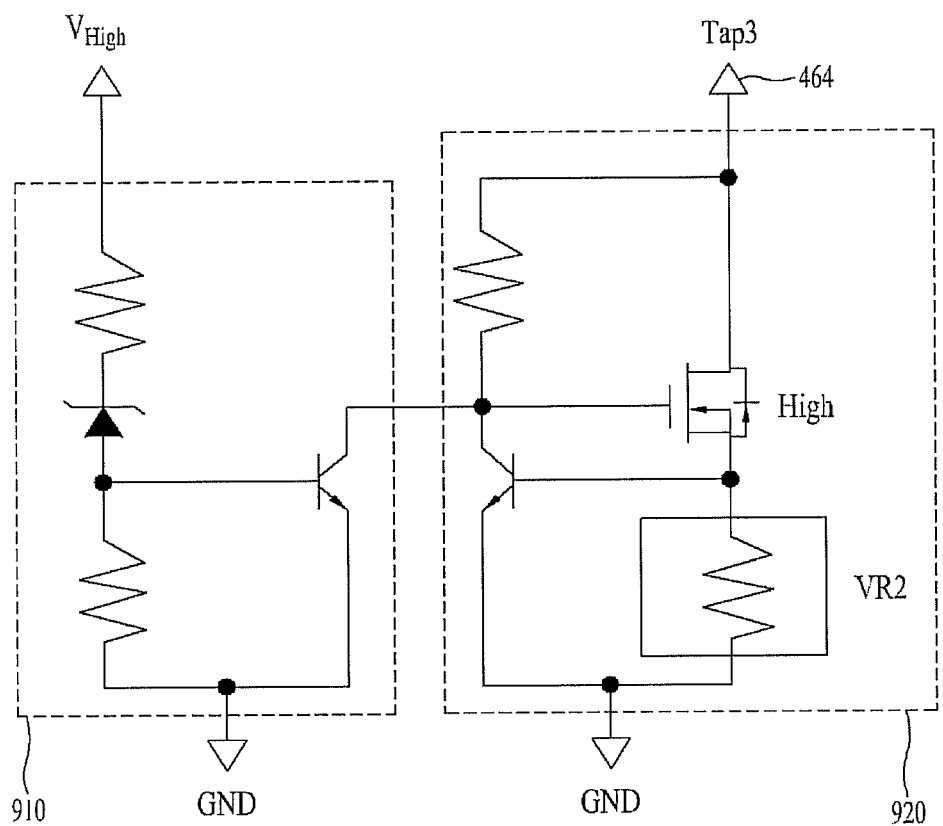
FIG. 9 is a block view illustrating an example of a detailed configuration of a third current source shown in FIG. 4 according to an embodiment.

FIG. 9 is a block view illustrating a detailed configuration of the third current source shown in FIG. 4.

FIG. 9 illustrates a circuit configuration of the third current source 466 possessed by the third light emitting unit 460, like FIG. 7.

Here, basically the third light emitting unit 460 may connected with the first light emitting unit 440 in parallel. Because of that, the third light emitting unit 460 may include a voltage level sensing circuit connected with a rear end of the rectifier unit and a current control circuit located in right, as shown in FIGS. 7 and 8. Here, the third light emitting unit 460 may be controlled by the third connection control means 464, instead of the first connection control means 444.

As a result, the circuit configuration of FIG. 9 is the same as that of FIG. 7 and the description of FIG. 7 mentioned above may be quoted. Repeated description will be omitted accordingly.

Here, each component shown in FIGS. 7 to 9 may have the same purpose, intension and function and the circuit configuration may be the same. However, a value of the circuit element may be different.

For example, as mentioned above, the number of the light emitting diodes provided in the light emitting group of the third light emitting unit 460 may be smaller than the number of the light emitting diodes provided in the light emitting group of the first light emitting unit 440. In this case, a value of a circuit element required by each circuit configuration may be different. In contrast, although the value of the circuit element is the same, the quantity of the input voltages or currents may be controlled.

Figure 10:
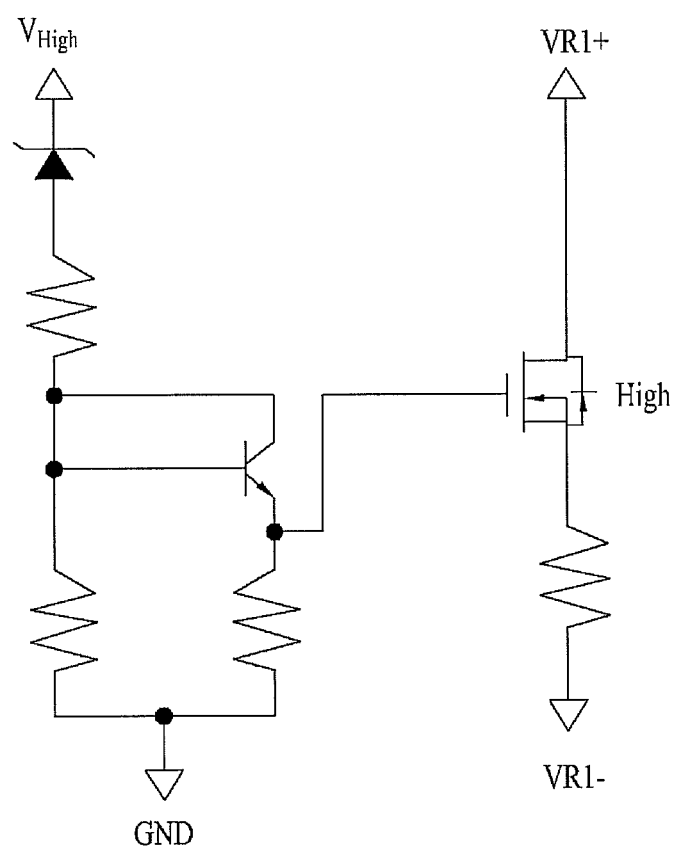
FIG. 10 is a block view illustrating an example of a detailed circuit configuration of a feedback resistance (VR1) shown in FIG. 8.

FIG. 10 is a block view illustrating an example of a detailed circuit of the feedback circuit resistance (VR1) shown in FIG. 8.

FIG. 10 illustrates a detailed circuit diagram of the feedback resistance (VR1) shown in FIG. 8. The feedback resistance (VR1) may be configured of a switching element and resistance elements to control a level for current control, for example.

In the meanwhile, a switching control circuit is provided in a right area in FIG. 10, relating to current control in the current control circuit. The switching control circuit may enable the current control performed based on the level.

Figure 11:
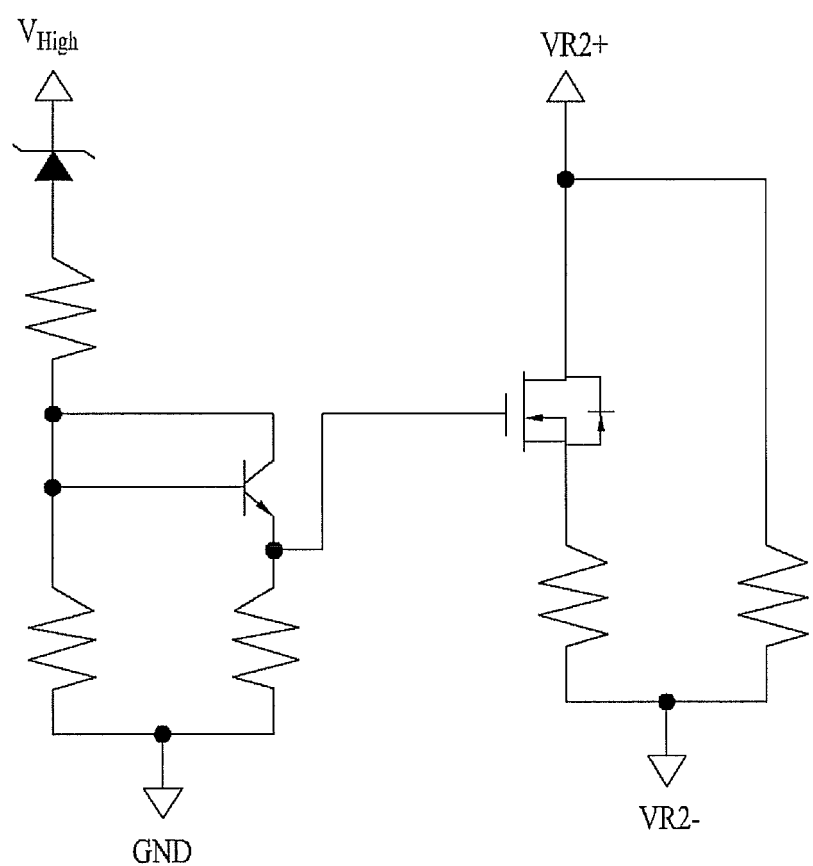
FIG. 11 is a block view illustrating an example of a detailed circuit configuration of a feedback resistance (VR2) shown in FIG. 9.

FIG. 11 is a block view illustrating an example of the detailed circuit configuration possessed by a feedback resistance (VR2) shown in FIG. 9.

A right switching control area and a right feedback resistance shown in FIG. 11 may be the same as the circuit configuration shown in FIG. 10 mentioned above.

As a result, here, the detailed description thereof will be described and the above description may be quoted.

As mentioned above, the feedback resistances of FIGS. 10 and 11 may be connected with different light emitting units, respectively. A circuit element value of each circuit configuration may be different from each other.

Figure 12:
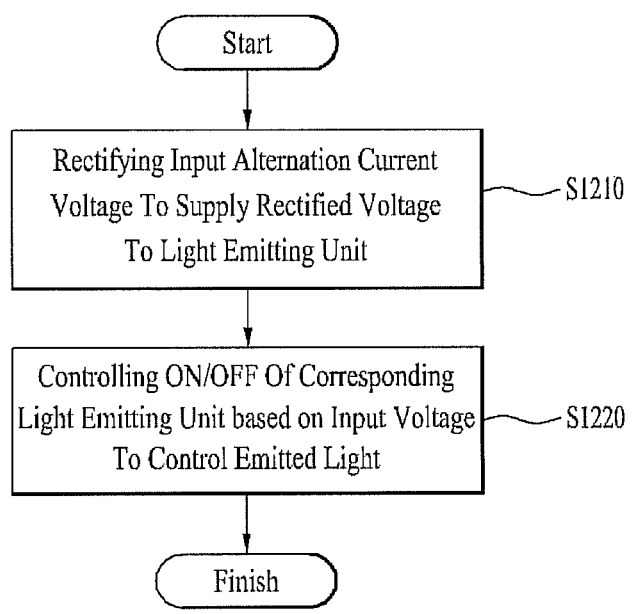
FIG. 12 is a flow chart illustrating a method of controlling a light emitted from the lighting device according to an embodiment.

FIG. 12 is a flow chart illustrating a method of controlling the light emitted from the lighting device according to an embodiment.

The method of controlling the light emitted from the lighting device including the plurality of the light emitting units configured of light emitting diodes connected in series according to the embodiment will be described as follows.

First of all, the rectifier unit may rectify an alternation current voltage input thereto and it may supply the rectified voltage to each of the light emitting units 440, 450 and 460 (S1210).

The control unit may control on and off of corresponding one out of the light emitting units according to the input rectified voltage, to control lights emitted from the light emitting units (S1220).

According to the process shown in FIG. 12, the first light emitting unit 440 may be connected with the third light emitting unit 460 in parallel and with the second light emitting unit 450 in series, among the light emitting units.

In the meanwhile, in the step of S1220, the control unit may control each of the light emitting units to be on and off based on the input voltage, for the light velocity of the lighting device not to be reversed.

Also, in the step of S1220, each of the light emitting units may be on and off via the connection control means 444, 454 and 464.

The third light emitting unit 460 may have a less number of light emitting diodes connected in series, compared with the first light emitting unit 440.

In the step of S1220, the control unit may control the number of the light emitting diodes switched on based on the input voltage not to be increased linearly.

In the step of S1220, the control unit may control the first light emitting unit 440 to be switched on until a first level and the third light emitting unit 460 to be switched on until a second level and the second light emitting unit 450 to be switched on until a third level.

Also, in the step of S1220, the first light emitting unit 440 and the third light emitting unit 460 may be switched on simultaneously or together until the first level.

In the step of S1220, the first light emitting unit 440 and the second light emitting unit 450 may not be switched on simultaneously.

In the step of S1220, the second light emitting unit 450 may be switched on before the third light emitting unit 460 is switched off.

Also, in the step of S1220, the control unit may control the first light emitting unit 440 to be switched on only in a first period, the third light emitting unit 450 to be switched on only in first and second periods and the second light emitting unit 450 to be switched on before the off of the third light emitting unit 460 in the second period.

In the step of 1220, the third light emitting unit 460 may be switched on from the first period, In the step of S1220, the first light emitting unit 440 and the third light emitting unit 460 may be switched on simultaneously or together until the first period.

Figure 13:
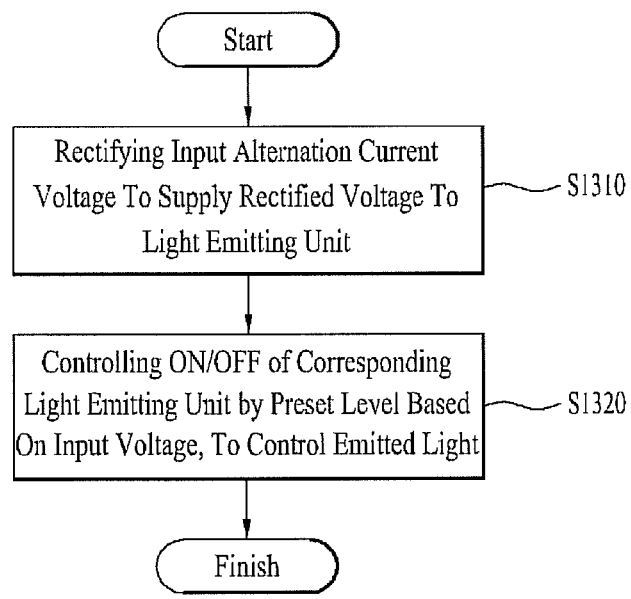
FIG. 13 is a flow chart illustrating a method of controlling a light emitted from the lighting device according to another embodiment.

FIG. 13 is a flow chart illustrating a method of controlling a light emitted from the lighting device according to another embodiment.

As follows will be described the method of controlling the light emitted from the light emitting units configured of the plurality of the light emitting diodes connected in series according to the embodiment.

First of all, the rectifier unit may rectify an alternation current voltage input thereto and it may supply the rectified voltage to each of the light emitting units 440, 450 and 460 (S1310).

The control unit may control corresponding one of the light emitting units to be on and off based on the input voltage by a preset level (S1320).

Here, the control unit may control the first light emitting unit 440 to be switched on until a first level, the third light emitting 460 to be switched on until a second level and the second light emitting unit 450 to be switched on until a third level. At this time, the control unit may be control of on and off of each light emitting unit for change in the light velocity not to be reversed based on the input voltage.

The first light emitting unit 440 may be connected with the third light emitting unit 460 in parallel and the first light emitting unit 440 may be connected with the second light emitting unit 450 in series.

Figure 14:
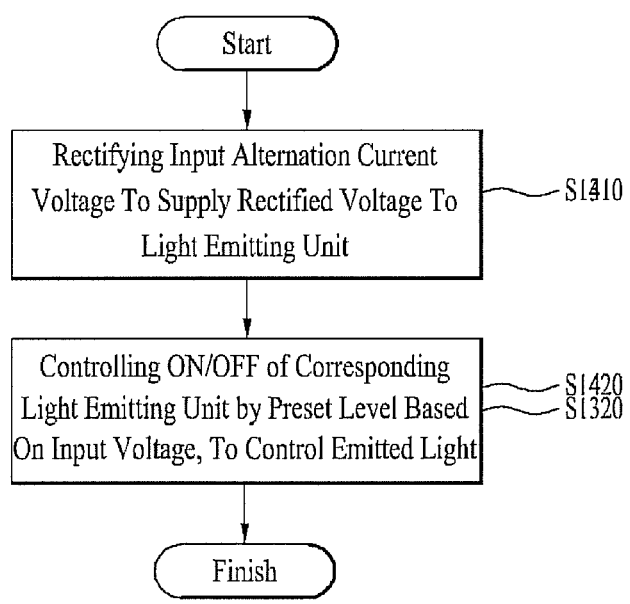
FIG. 14 is a flow chart illustrating a method of controlling a light emitted from the lighting device according to a further embodiment.

FIG. 14 is a flow chart illustrating a flow chart illustrating a method of controlling a light emitted from the lighting device according to a further embodiment.

As follows will be described the method of controlling the light emitted from the light emitting units configured of the plurality of the light emitting diodes connected in series according to the embodiment.

First of all, the rectifier unit may rectify an alternation current voltage input thereto and it may supply the rectified voltage to each of the light emitting units 440, 450 and 460 (S1410).

The control unit control corresponding one of the light emitting units based on the rectified voltage inputted thereto to be on and off by a preset period (S1420).

Here, the control unit may control the first light emitting unit 440 to be switched on only in a first period, the third light emitting unit 460 to be switched on only in first and second periods and the second light emitting unit 450 to be switched on from a second period. At this time, the control unit may control each of the light emitting units to be on and off for the light velocity change not to be reversed based on the input voltage.

The first light emitting unit 440 may be connected with the third light emitting unit 460 in parallel and the first light emitting unit 440 may be connected with the second light emitting unit 450 in series.

Therefore, according to the present invention as mentioned above, the reverse of the light velocity based on the input voltage may be prevented. Because of that, a power factor, efficiency, dimming performance of the lighting device may be enhanced. Also, the circuit may be realized simply via an auxiliary cell and the rising cost may be minimized.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting device including light emitting units configured of a plurality of light emitting diodes connected with each other in series, the lighting device comprising:
   a rectifier unit configured to rectify an alternation current voltage to supply the rectified voltage to each of the light emitting units;
   a control unit configured to control on and off of each light emitting unit according to input voltage; and
   the light emitting units configured to be on and off based on the control of the control unit,
   wherein a first light emitting unit and a second light emitting unit are connected with each other in series, and the first light emitting unit and a third light emitting unit are connected with each other in parallel, and
   wherein the control unit controls the on and off of the light emitting unit to prevent reversed light velocity change of the lighting device based on the input voltage input.

2. The lighting device of claim 1, wherein the control unit controls the on and off of a corresponding light emitting unit via the connection control means, respectively.

3. The lighting device of claim 2, wherein the third light emitting unit includes a less number of light emitting diodes connected in series than the first light emitting unit.

4. The lighting device of claim 3, wherein the number of the light emitting diodes switched on according to the input voltage does not be increased linearly.

5. The lighting device of claim 4, wherein the control unit controls the first light emitting unit to be switched on until the first level, the third light emitting unit to be switched on until a second level and the second light emitting unit to be switched on until a third level, according to the input voltage.

6. The lighting device of claim 5, wherein the control unit controls the first and third light emitting unit to be switched on simultaneously or them to be on until the first level together.

7. The lighting device of claim 5, wherein the control unit controls the first and second light emitting units not to be on simultaneously.

8. The lighting device of claim 5, wherein the control unit controls the second light emitting unit to be on before the third light emitting unit is off.

9. The lighting device of claim 4, wherein the control unit controls the first light emitting unit to be switched on until the first period, the third light emitting unit to be switched on until the second period, and the second light emitting unit to be switched on before switching off the third light emitting unit until the second period.

10. The lighting device of claim 9, wherein the control unit controls the third light emitting unit to be switched on from the first period.

11. The lighting device of claim 10, wherein the control unit controls the first and third light emitting units to be switched on simultaneously or to be on until the first period together.

12. A lighting device including light emitting units configured of a plurality of light emitting diodes connected with each other in series, the lighting device comprising:
    a rectifier unit configured to rectify an alternation current voltage to supply the rectified voltage to each of the light emitting units;
    a control unit configured to control a first light emitting unit to be switched on until a first level and a third light emitting unit to be switched on until a second level and a second light emitting unit to be switched on until a third level, to prevent light velocity change from being reversed according to the input voltage by controlling on and off of each of the light emitting units; and
    the light emitting units configured to be switched on and off based on the control of the control unit.

13. The lighting device of claim 12, wherein the first light emitting unit and a third light emitting unit are connected with each other in parallel.

14. The lighting device of claim 12, wherein the first light emitting unit and the second light emitting unit are connected with each other in series.

15. A lighting device including light emitting units configured of a plurality of light emitting diodes connected in series, the lighting device comprising:

a rectifier unit configured to rectify an alternation current voltage to supply the rectified voltage to each of the light emitting units;

a control unit configured to control a first light emitting unit to be switched on only in a first period and a third light emitting unit to be switched on only in first second periods and a second light emitting unit to be switched on before the third light emitting unit is switched off in the second period, to prevent light velocity change from being reversed according to the input voltage by controlling on and off of each of the light emitting units; and the light emitting units configured to be switched on and off based on the control of the control unit.

16. The lighting device of claim 15, wherein the first light emitting unit and a third light emitting unit are connected with each other in parallel.

17. The lighting device of claim 15, wherein the first light emitting unit and the second light emitting unit are connected with each other in series.

18. A method of controlling a light in a lighting device including light emitting units configured of a plurality of light emitting diodes connected in series, the method comprising:
(a) rectifying an alternation current voltage input thereto and supplying the rectified voltage to each of the light emitting units at a rectifier unit; and
(b) controlling on and off of corresponding one out of the light emitting units according to the input rectified voltage, to control lights emitted from the light emitting units at a control unit,
wherein a first light emitting unit is connected with a third light emitting unit in parallel and with a second light emitting unit in series, among the light emitting units, and
wherein the light emitting unit is switched on and off to prevent reversed light velocity change of the lighting device based on the input voltage input at the step of (b).

19. The method of claim 18, wherein a corresponding light emitting unit is switched on and off via the connection control means at the step of (b).

20. The method of claim 19, wherein the third light emitting unit includes a less number of light emitting diodes connected in series than the first light emitting unit.

21. The method of claim 20, wherein the number of the light emitting diodes switched on according to the input voltage does not be increased linearly at the step of (b).

22. The method of claim 21, wherein the first light emitting unit is switched on until the first level, the third light emitting unit is switched on until a second level and the second light emitting unit is switched on until a third level, according to the input voltage at the step of (b).

23. The method of claim 22, wherein the first and third light emitting unit is switched on simultaneously or them on until the first level together at the step of (b).

24. The method of claim 22, wherein the first and second light emitting units does not to be on simultaneously at the step of (b).

25. The method of claim 22, wherein the second light emitting unit is on before the third light emitting unit is off at the step of (b).

26. The method of claim 21, wherein the first light emitting unit is switched on until the first period, the third light emitting unit is switched on until the second period, and the second light emitting unit is switched on before switching off the third light emitting unit until the second period at the step of (b).

27. The method of claim 26, wherein the third light emitting unit is switched on from the first period at the step of (b).

28. The method of claim 27, wherein the first and third light emitting units is switched on simultaneously or on until the first period together at the step of (b).

29. A method of controlling a light in a lighting device including light emitting units configured of a plurality of light emitting diodes connected in series, the method comprising:
rectifying an alternation current voltage input thereto and supplying the rectified voltage to each of the light emitting units at a rectifier unit; and
controlling corresponding one of the light emitting units to be on and off based on the input voltage by a preset level at a control unit,
wherein a first light emitting unit is switched on until a first level, a third light emitting is switched on until a second level and a second light emitting unit is switched on until a third level, and
wherein each light emitting unit is switched on and off for change in the light velocity not to be reversed based on the input voltage.

30. The method of claim 29, wherein the first light emitting unit and a third light emitting unit are connected with each other in parallel.

31. The method of claim 29, wherein the first light emitting unit and the second light emitting unit are connected with each other in series.

32. A method of controlling a light in a lighting device including light emitting units configured of a plurality of light emitting diodes connected in series, the method comprising:
rectifying an alternation current voltage input thereto and supplying the rectified voltage to each of the light emitting units at a rectifier unit; and
controlling corresponding one of the light emitting units based on the rectified voltage inputted thereto to be on and off by a preset period at a control unit,
wherein a first light emitting unit is switched on only in a first period, a third light emitting unit is switched on only in first and second periods and a second light emitting unit is to be switched on from a second period, and
wherein each of the light emitting units is switching on and off for the light velocity change not to be reversed based on the input voltage.

33. The method of claim 32, wherein the first light emitting unit and a third light emitting unit are connected with each other in parallel.

34. The method of claim 33, wherein the first light emitting unit and the second light emitting unit are connected with each other in series.

* * * * *